United States Patent

Hosmer

[11] Patent Number: 5,797,172
[45] Date of Patent: Aug. 25, 1998

[54] TENTER FRAME AND METHOD

[75] Inventor: Christopher Eugene Hosmer, Greer, S.C.

[73] Assignee: Marshall and Williams Company, Greenville, S.C.

[21] Appl. No.: 787,642

[22] Filed: Jan. 23, 1997

Related U.S. Application Data

[63] Continuation-in-part of Ser. No. 641,350, Apr. 30, 1996, Pat. No. 5,613,284.

[51] Int. Cl.$^6$ .................................................. D06C 3/04
[52] U.S. Cl. .............................................. 26/89; 26/93
[58] Field of Search .......................... 26/89, 93, 96, 26/95, 94, 73, 72; 198/838, 845; 29/445, 525, 898.055, 898.15; 264/288.4, 291

[56] References Cited

U.S. PATENT DOCUMENTS

| | | | |
|---|---|---|---|
| 2,285,820 | 6/1942 | MacKnight | 26/93 |
| 3,240,412 | 3/1966 | Zygan et al. | 26/93 |
| 3,457,608 | 7/1969 | Gageur | 26/93 |
| 3,469,291 | 9/1969 | Gageur | 26/93 |
| 3,500,515 | 3/1970 | Cunningham et al. | 26/93 |
| 3,638,289 | 2/1972 | Dornier et al. | 26/93 |
| 4,602,407 | 7/1986 | Gresens | 26/89 |
| 4,674,159 | 6/1987 | Sclater et al. | 26/89 |
| 4,736,498 | 4/1988 | Langer et al. | 26/93 |
| 4,882,820 | 11/1989 | MacKinnon et al. | 26/89 |
| 4,926,529 | 5/1990 | Hosmer et al. | 26/89 |
| 5,067,214 | 11/1991 | Hosmer et al. | 26/89 |
| 5,161,674 | 11/1992 | Rutz et al. | 26/73 |
| 5,367,753 | 11/1994 | Mueller | 26/93 |
| 5,390,398 | 2/1995 | Rutz et al. | 26/93 |

FOREIGN PATENT DOCUMENTS

| | | | |
|---|---|---|---|
| 2605510 | 8/1977 | Germany | 26/89 |
| 0178356 | 8/1986 | Japan | 26/89 |
| 2032975 | 5/1980 | United Kingdom | 26/93 |

*Primary Examiner*—Amy B. Vanatta
*Attorney, Agent, or Firm*—Ralph Bailey

[57] ABSTRACT

Tenter frame apparatus includes an endless chain for carrying tenter clips (A) on one side of a monorail (B) for positioning a web (W) for transport on a single pair of longitudinally aligned bearings (C) carried in horizontal alignment with the web (W), and for guidance on a stationary track (D) by a wear strip (E) first opposed wear pads (F) opposite the bearings and second opposed wear pads (G) at the top of the monorail. Since the bearings (C) do not engage drive sprockets at turnarounds impact and high loads are avoided. In some applications wear strips may be substituted for the bearings (C).

9 Claims, 3 Drawing Sheets

TENTER FRAME AND METHOD

This application is a Continuation-in-Part of application Ser. No. 08/641,350, filed Apr. 30, 1996 now U.S. Pat. No. 5,613,284.

BACKGROUND OF THE INVENTION

This invention relates to a tenter frame and method especially useful for treating textile webs wherein a longitudinally aligned anti-friction means such as bearings or pad configuration carry each tenter clip on an opposite side of a monorail and wherein guidance is provided by low friction material on the tenter clip, at the top of the monorail and under a chain carrying the tenter clips.

Monorails have been used primarily for tenter frames in the manufacture of plastic film such as illustrated in U.S. Pat. No. 3,457,608 wherein longitudinally aligned bearings are provided at the top of the monorail and additional bearings are provided for supporting the tenter clips on rails, with all monorail guidance accomplished by rolling element bearings. Such constructions are expensive in that mounting the required number of rolling element bearings in several vertical and horizontal planes creates a large, complex and heavy tenter chain and track system. It is desirable to use monorail constructions of laminated bands or strips so as to facilitate limited angular displacement of adjacent track sections when necessary. This is made possible because the laminated flexible metal bands or strips are easily configured for passing about curves such as those encountered in tenter frames and the like, and can be constructed in lengths which allow them to be mounted to the entire length of the tenter as one piece. The chain need not be engaged by sprockets at turnarounds utilizing such constructions.

The tenter frame illustrated herein is especially useful in processing of textile material but such frames are also useful in other webs such as plastic film utilized in photographic film and the like. The use of plastic wear strips constructed from low friction syntyhetic resin such as Vespel or other polyimide is illustrated in U.S. Pat. Nos. 4,926,529 and 5,067,214. This anti-friction material may be advantageously used in bearings and in wear strips or wear pads for supporting the tenter clips and chains during operation. A tenter chain of this type is illustrated in U.S. Pat. No. 4,260,844.

It is desirable to provide tentering apparatus of inexpensive construction which may be used particularly in textiles wherein substantial loads may be supported by longitudinally spaced pairs of aligned bearings which receive symmetrical, in line loads imposed by the web which lies in the same plane. Inexpensive wear strips and the like constructed of suitable anti-friction material, such as polyimide, may be utilized as guides for the ball bearing members and the tenter clips. Anti-friction guides may be configured in such a way that the loads on wear strips are minimal. Thus, wear strips and pads serve in large measure for guidance only rather than as force resisting members without causing undue friction. It has been found that such construction may be effectively used because of its simplicity, compact size, light weight and because of the advantageous use of wear strips in combination with the longitudinally spaced, aligned ball bearing members.

The state of the art is further illustrated in the following U.S. Pat. Nos. 3,055,048, 3,142,108, 3,240,412, 3,457,608, 3,469,291, 3,500,515, 3,580,451, 3,638,289, 4,080,692, 4,134,189, 4,176,429, 4,435,884, 4,639,984, 4,736,498, 4,815,181, 4,882,820, 4,890,365, 5,161,674, 5,265,313, 5,341,547, and 5,390,398.

It is a further object of the invention to provide a less expensive construction for use with light loads by utilizing wear pads in lieu of bearings.

SUMMARY OF THE INVENTION

Accordingly, it is an important object of the present invention to provide tentering apparatus utilizing a monorail construction wherein longitudinally spaced pairs of ball bearings lie in the same plane as the web being treated on an opposite side of the monorail which includes the provision of wear strips and pads acting as guide members offering support vertically above and below as well as opposite the load bearing anti-friction bearings rotating upon the monorail. A single pair of bearings are provided for each tenter clip with no necessity for the inclusion of additional bearings.

The construction utilizes wear strips and pads in combination with ball bearings on both sides of a continuous band or monorail which provides several design advantages. Ball bearings do not contact the sprockets at turnarounds at ends of the tenter frame eliminating high load, high impact forces with instant stopping of rotation thereof. Thus, the ball bearings do not reverse direction or stop as in conventional textile tenter designs. The chain is fully captured by the track all the way around for smoother operation at high speeds. The use of wear pads as lightly loaded bearings allows a compact, lightweight and low cost design. The chain is below the clip rather than behind it as in the common textile ball bearing tenter design, which means less spreading of the clips at the sprocket turnarounds reducing shock to the chain as results from the center of mass of the clips being outside of the vertical centerline of the chain. Moreover, sprockets do not engage the bearings at turnarounds. This allows a deeper clip or throat for better reception of cloth webs. Since only two ball bearings are used, a special on-line relubrication feature is feasible such as illustrated in U.S. Pat. No. 4,620,844.

The single, continuous multi-band laminated track has advantages in that gaps which are difficult in transition and which may cause excess wear on chain mounted wear pads and impact on bearings are eliminated. The number of parts in the rails are reduced for improved reliability and easier installation and maintenance. The ball bearings are well shielded from contamination by the track construction. Also, the single, continuous band track is less susceptible to damaging of the rails and chain due to failures of the rail width adjusting mechanism of the tenter.

Suitable single or multiple wear pads may be substituted at each tenter clip for use in lieu of the bearings in light load configurations.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
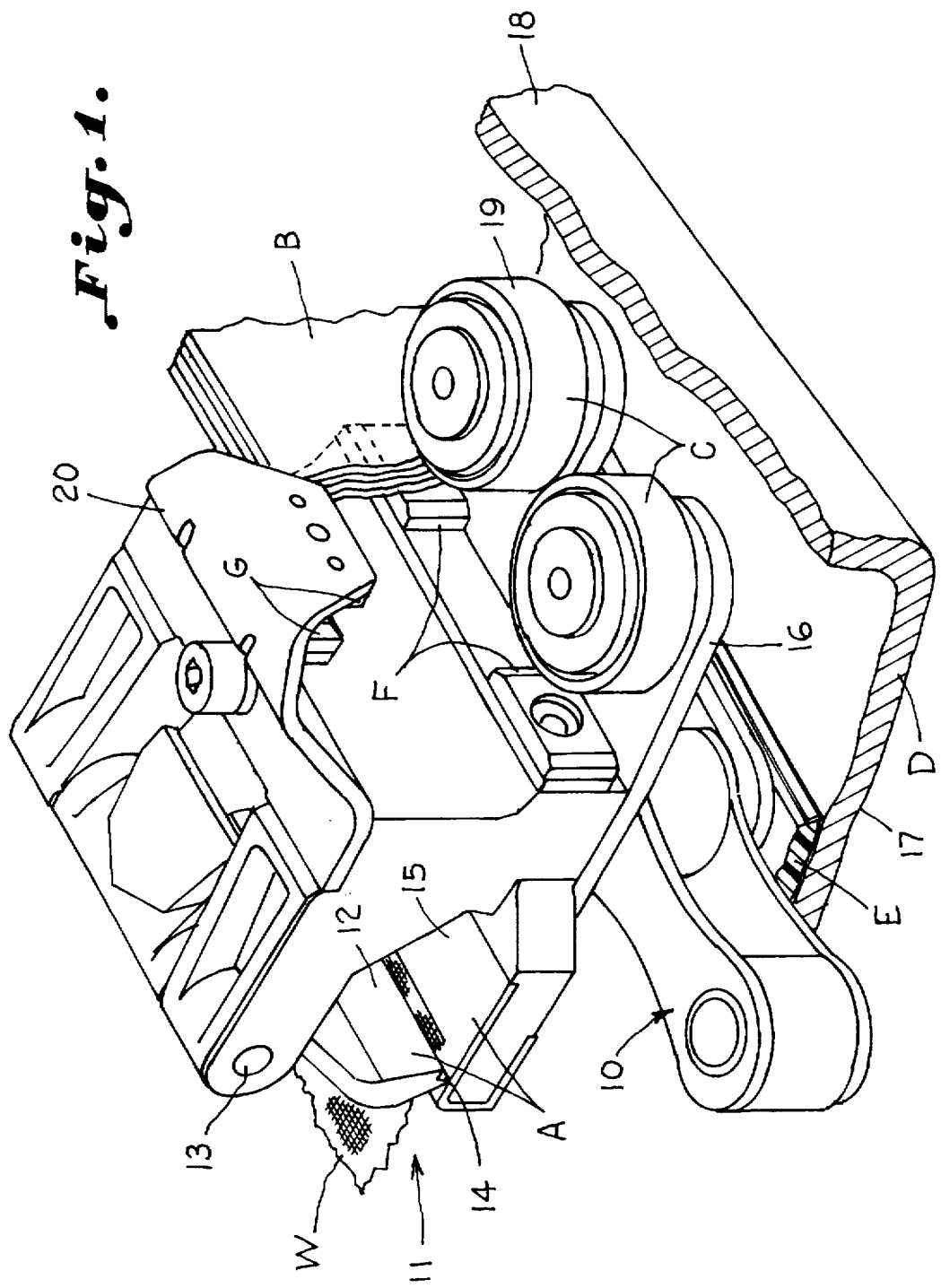
FIG. 1 is a perspective view illustrating a tenter chain and associated parts constructed in accordance with the invention wherein a pair of longitudinally spaced ball bearings are carried on vertical axes to support respective tenter clips carried on the chain wherein opposed wear pads are provided on opposite sides of the monorail in the same plane as the web being treated, and wherein guidance is supplied for the chain and the tenter clip carried thereby by a lower wear strip carried on a track for the chain together with opposed wear strips at the top of the monorail.
Figure 2:
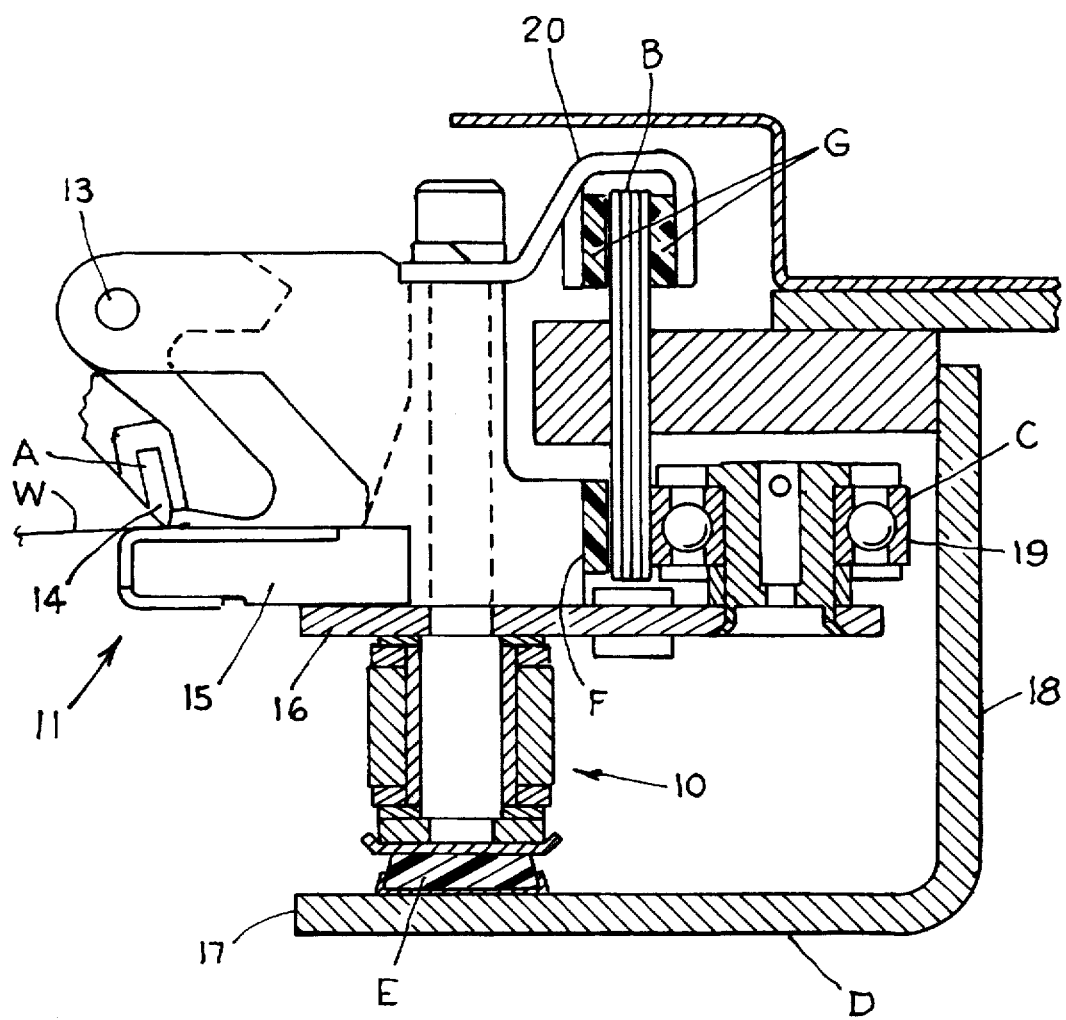
FIG. 2 is a transverse sectional elevation illustrating the configuration of the ball bearings for resisting the force engendered by the web and wear strips and pads for guidance in the horizontal and vertical planes thus simplifying the construction of the tentering apparatus.

FIGS. 1 and 2 of the drawings best illustrate tenter frame apparatus for use with a driven chain carrying tenter clips A supporting a web W in open width. A single vertical stationary monorail B supports the tenter clips transporting the web W in open width for subjecting the web to a treatment medium. A longitudinal stationary track D is positioned beneath the chain for guiding the chain for longitudinal movement on the monorail. A longitudinal horizontally disposed wear strip E is carried by the track providing a low friction bearing surface for guiding the endless chain for longitudinal movement. A single pair of horizontal longitudinally aligned bearings C on vertical axes supporting each of said tenter clips on a back side of said monorail in opposed horizontal alignment with said web for carrying the tenter clips during treatment of the web. First wear pads F are fixed to the tenter clips opposite the bearings on a front side of the monorail. Second wear pads G on said tenter clips provide guidance therefor at a top of the monorail. Thus, a compact, accessible monorail apparatus is provided for a tenter frame utilizing a pair of bearings for support and low friction wear strips and wear pads for guidance.

Figure 3:
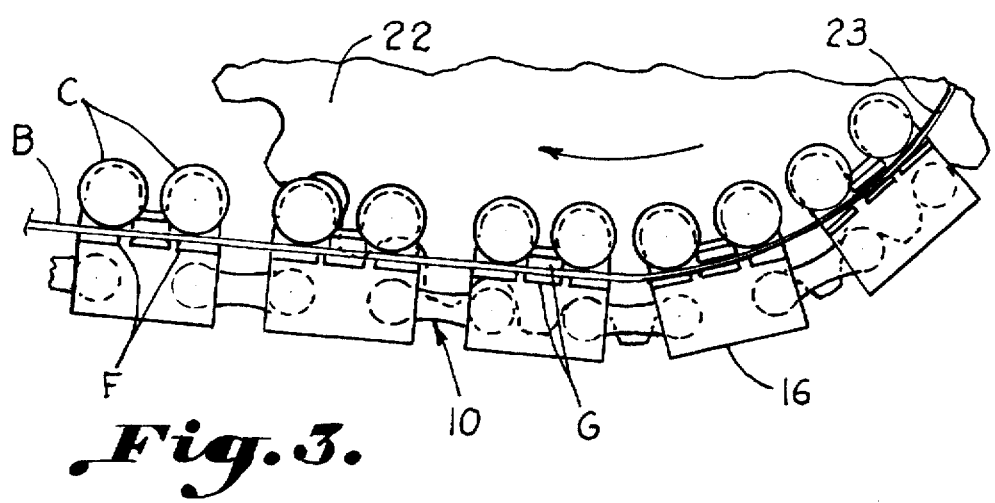
FIG. 3 is a plan view schematically illustrating the positioning of the chain and tenter clips at a turnaround while being driven by a drive sprocket.

FIG. 3 is a schematic top plan view illustrating the chain 10, ball bearings C, and wear pads F with their relationship to the monorail B and sprockets 22 with the monorail extending entirely about turnarounds at each end of the tenter as at 23.

The tenter frame apparatus includes an endless chain broadly designated at 10 for transporting tenter clips A longitudinally for fluid treating a web W such as cloth or plastic film as in a desirable process involving heated air or liquid and the like. The chain 10 carries a plurality of spaced tenter clips A in such a way that the web W is held between gripping jaws broadly designated at 11. The tenter clips further include movable upper gripping jaws 12 pivoted as at 13 for positioning a gripping blade 14 to secure the web W against lower stationary gripping jaws 15. A base member or bracket 16 is provided for supporting each tenter clip A upon the chain 10.

It will be observed in FIGS. 1 and 2 that the tenter clips are each supported upon a monorail B which is assembled in stationary relationship with a horizontal rail D for carrying the movable members associated with the chain for horizontal movement during treatment of the web.

Referring to FIGS. 1 and 2, it will be further noted that a longitudinal wear strip E is carried by a horizontal leg 17 of the rail or track D for offering guidance to the chain 10 and the tenter clips during transport of the tenter clips during a tentering operation. The horizontal portion of the track D is carried by an upright leg 18 for maintaining the assembled relationship between the monorail and the track D.

The load bearing members are limited to the pair of horizontal bearings C carried about vertical axes in a horizontal plane diametrically opposed to the web W which lies in the medial plane of the bearings. Due to the cylindrical rolling surface 19 afforded by the bearings, no other substantial load bearing element is required. The wear strip E carries the relatively low vertical force caused by the weight of the tenter chain, while spaced longitudinal wear strips F opposite the bearings C and opposed upper wear strips G carried by a bracket 20 on respective tenter clips on opposite sides at the top of the monorail offer guidance and are only subjected to limited incidental force bearing requirements.

Figure 4:
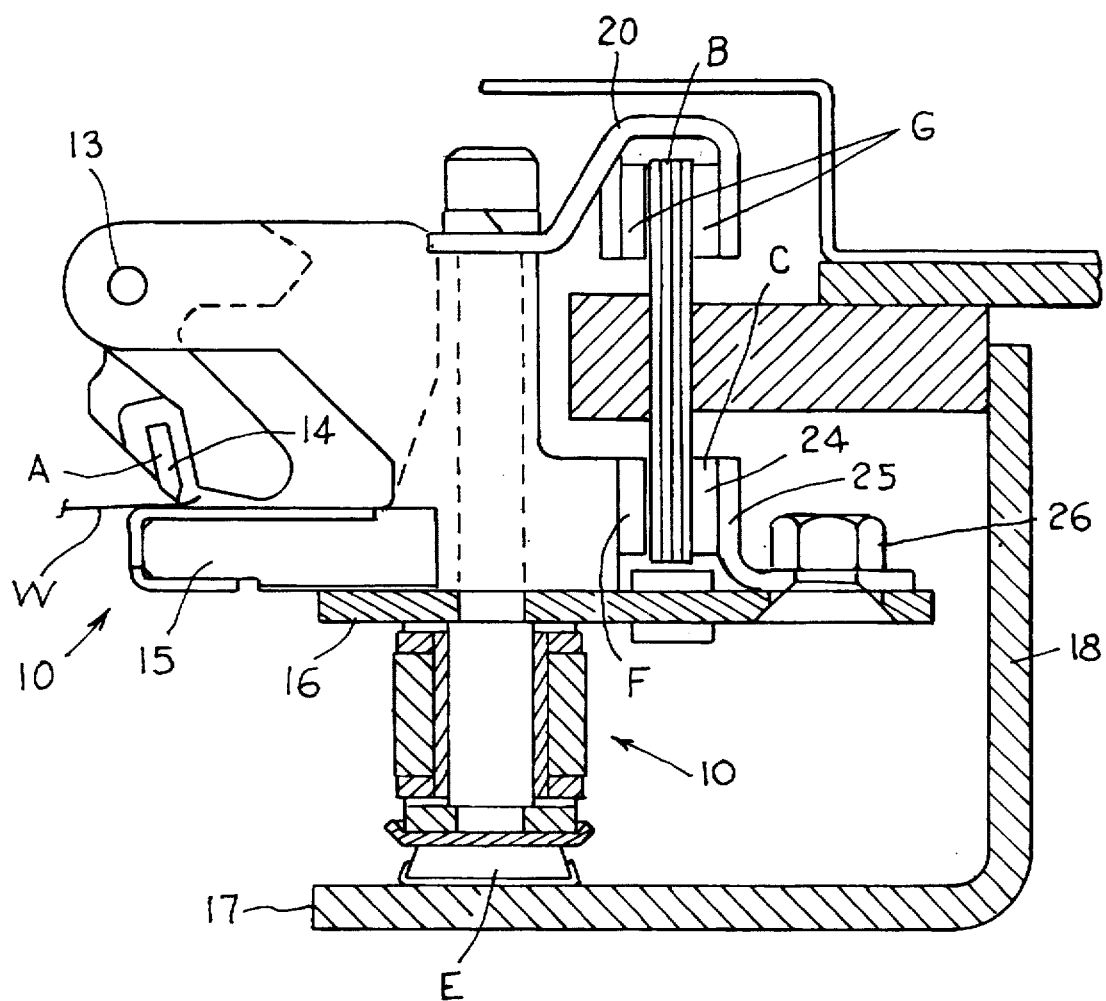
FIG. 4 is a transverse sectional elevation similar to FIG. 2 illustrating a modified form of the invention wherein a wear strip preferably constructed of a high performance synthetic material such as polyimide is utilized to support the tenter clips on the back side of the monorail.

FIG. 4 illustrates a modified form of the invention wherein ball bearings 19 have been replaced with wear pads 24 preferably constructed of a synthetic material such as polyimide resin. A single elongated wear pad C may be provided in lieu of each pair of ball bearings. This embodiment of the invention may be economically advantageous when the horizontal stretching forces required are relatively low. Each wear pad 24 is illustrated as being carried by a bracelet 25 secured by bolts 26 to each base member 16.

It is thus seen that the ball bearings do not engage the turnaround drive sprockets, thus eliminating impact, high load, and sudden stoppage of rotation. Thus, the ball bearings cannot reverse rotation or vary the load, as they or other anti-friction means only contact the monorail on one side. Since the monorail is continuous around the turnarounds where the chain direction is reversed, the chain's motion is always controlled by the monorail, not being disengaged from and having to re-engage the track at the turnarounds as in conventional constructions.

While a preferred embodiment of the invention has been described using specific terms, such description is for illustrative purposes only, and it is to be understood that changes and variations may be made without departing from the spirit or scope of the following claims.

What is claimed is:

1. Tenter frame apparatus for carrying tenter clips supporting a web in open width comprising:

a single vertical stationary monorail for supporting said tenter clips transporting the web in open width for subjecting the web to a treatment medium;

longitudinally aligned anti-friction means supporting each of said tenter clips on a back side of said monorail in opposed horizontal alignment with said web for carrying the tenter clips during treatment of the web;

a driven chain beneath said tenter clips for moving the web supported thereby;

a longitudinal stationary track for guiding the chain and the web for longitudinal movement on said monorail;

a longitudinal horizontally disposed wear strip carried by said track providing a low friction bearing surface for guiding the chain for longitudinal movement;

first wear pads fixed to said tenter clips opposite said anti-friction means on a front side of said monorail; and second wear pads on said tenter clips providing guidance therefor at a top of said monorail;

whereby a compact, accessible monorail apparatus is provided for a tenter frame utilizing a longitudinally aligned anti-friction means for support and low friction wear strips and wear pads for guidance out of contact with turnaround drive sprockets avoiding variations in load at a turnaround.

2. The tenter frame apparatus set forth in claim 1 wherein said longitudinally aligned anti-friction means is a vertical wear strip.

3. The tenter frame apparatus set forth in claim 2 wherein said wear strip and wear pads are polyimide.

4. The tenter frame apparatus set forth in claim 1 wherein said monorail is constructed of longitudinal laminated strips extending entirely about turnarounds avoiding temporary disengagement of the anti-friction means.

5. The tenter frame apparatus set forth in claim 1 wherein said first wear pads are positioned in longitudinally spaced pairs on each of said tenter clips.

6. The tenter frame apparatus set forth in claim 1 wherein said second wear pads are spaced on opposite sides at the top of the monorail.

7. A method of carrying tenter clips for supporting a web in open width comprising the steps of:

providing a single vertical stationary monorail for supporting said tenter clips while subjecting the web to a treatment medium;

guiding a chain carried beneath and driving the tenter clips for longitudinal movement on a low friction bearing surface;

utilizing longitudinally aligned anti-friction means supporting each of said tenter clips on a back side of said monorail in opposed horizontal alignment with said web for carrying the tenter clips during treatment;

mounting wear pads for guiding said tenter clips opposite said anti-friction means on a front side of said monorail; and supporting wear pads on said tenter clips at a top of said monorail for guiding said tenter clips for vertical alignment;

whereby a method is provided for use in a tenter frame during transport of the web for continuous guidance of the tenter clips thereby with the anti-friction means out of contact with a turnaround sprocket.

8. The method set forth in claim 7 including the step of constructing guiding elements including said low friction bearing surface and said wear pads of polyimide.

9. The method set forth in claim 7 wherein said anti-friction means are wear strips.

* * * * *